United States Patent [19]

Frost et al.

[11] 4,103,809

[45] Aug. 1, 1978

[54] PILOT'S KNEEPAD

[75] Inventors: Richard Butler Frost; Joseph Laszlo Juhasz; Barry Walter Wing, all of Sydney, Australia

[73] Assignee: Unisearch Limited, Kensington, Australia

[21] Appl. No.: 804,433

[22] Filed: Jun. 7, 1977

[30] Foreign Application Priority Data

Jun. 15, 1976 [AU] Australia .................... PC6275/76

[51] Int. Cl.² ........................................... A45C 11/00
[52] U.S. Cl. .................... 224/5 R; 108/43; 206/38; 224/28 D; 235/61 NV
[58] Field of Search ............. 206/38, 371, 214, 232; 224/5 R, 28 R, 28 D; 108/43; 235/61 NV, 88 N, 70 R

[56] References Cited

U.S. PATENT DOCUMENTS

| | | | |
|---|---|---|---|
| 1,930,478 | 10/1933 | Jones | 224/5 R |
| 2,073,352 | 3/1937 | Scharlaw | 235/88 N |
| 2,420,673 | 5/1947 | Monrad | 108/43 |
| 2,701,173 | 2/1955 | Senior et al. | 224/5 R |
| 3,037,693 | 6/1962 | Du Pont | 235/61 NV |
| 3,193,195 | 7/1965 | Jeffries, Jr. | 235/88 N |
| 3,215,453 | 11/1965 | Malcom, Jr. | 108/43 |
| 3,543,977 | 12/1970 | Lockridge | 224/5 R |

*Primary Examiner*—William T. Dixson, Jr.
*Attorney, Agent, or Firm*—Toren, McGeady and Stanger

[57] ABSTRACT

A pilot's kneepad for use as an aid to navigation by pilots and navigators of aircraft and other vessels consisting of a plate which has means for attaching it to the upper surface of the thigh of a seated pilot, the plate having on its upper surface information for use in navigational calculations and having hingedly attached to it along one edge a second plate the underside of which also carries information for use in navigational calculations and which has on its upper side means for attachment of a writing pad. Preferably, along one edge of the plate is provided a slide rule that can be used for making inflight calculations.

4 Claims, 2 Drawing Figures

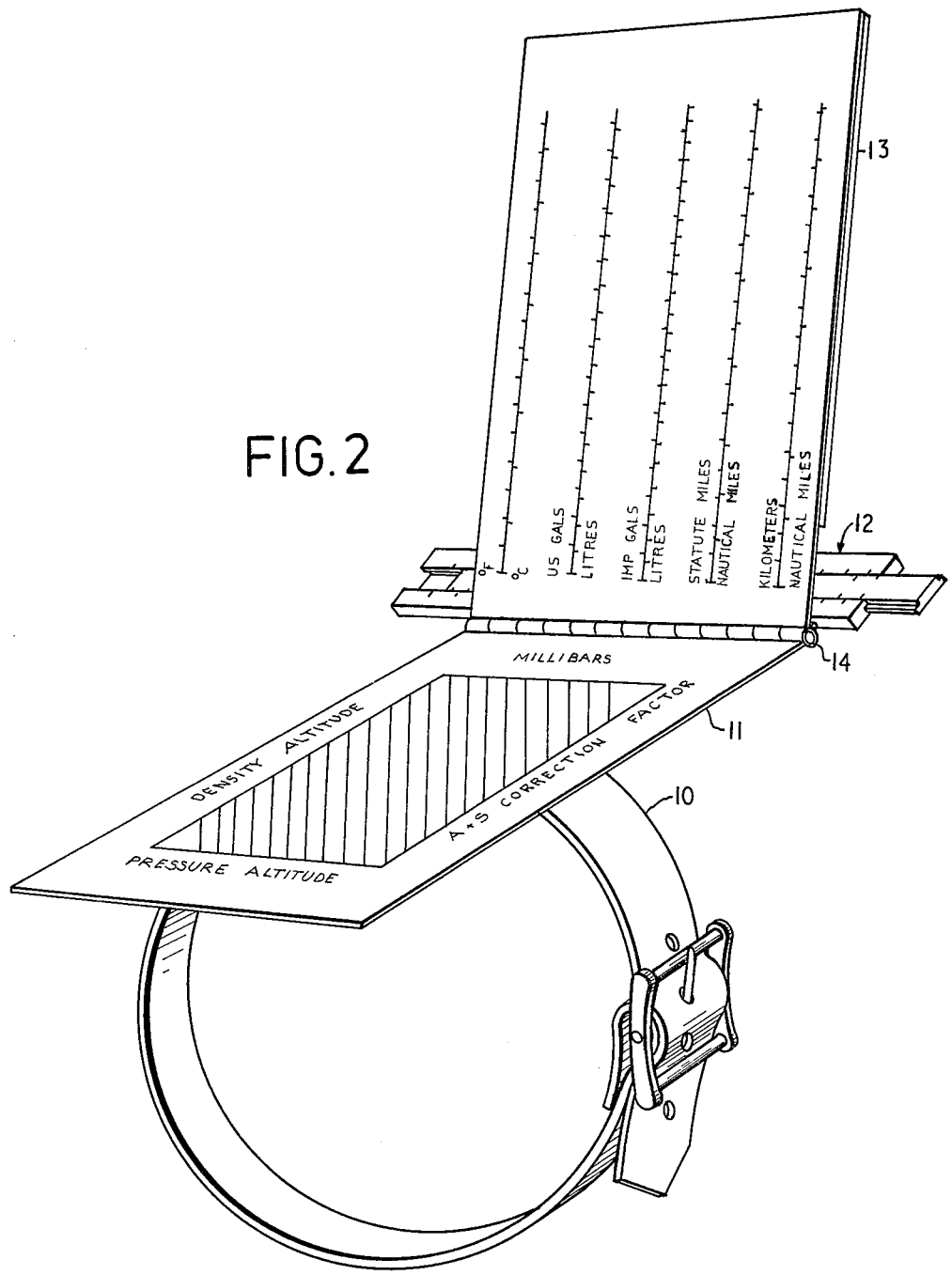

PILOT'S KNEEPAD

BACKGROUND OF THE INVENTION

The present invention relates to a pilot's kneepad and is intended as an aid to navigation for use by pilots and navigators of aircraft and other vessels.

In, for example, a light aircraft it is necessary for inflight calculations to be made relating to the course and speed of the aircraft and to facilitate such calculations it is usual for the pilot to have strapped to one knee a writing pad on which calculations can be made. It is the object of the present invention to provide an improved form of pilot's kneepad which further facilitates the pilot's task in providing additional data and in a preferred form an additional calculation facility.

SUMMARY OF THE INVENTION

The present invention consists in a pilot's kneepad comprising first plate means carrying on an upper surface information for use in navigational calculations and having affiliated with it means for attachment of the kneepad to the upper surface of a seated pilot's thigh to lie flat thereon, a second plate means overlying the first and being hinged thereto along one edge, said second plate means having on an upper surface means for attachment thereto of a writing pad and on a lower surface information for use in navigational calculations. It is preferred although not essential that on one edge of said first plate means slide rule means are provided.

BRIEF DESCRIPTION OF THE DRAWINGS

In order that the nature of the invention may be better understood a preferred form thereof is hereinafter described, by way of example, with reference to the accompanying drawings in which:

FIG. 2 is a similar view of the device in the open position.

DESCRIPTION OF THE INVENTION

Figure 1:
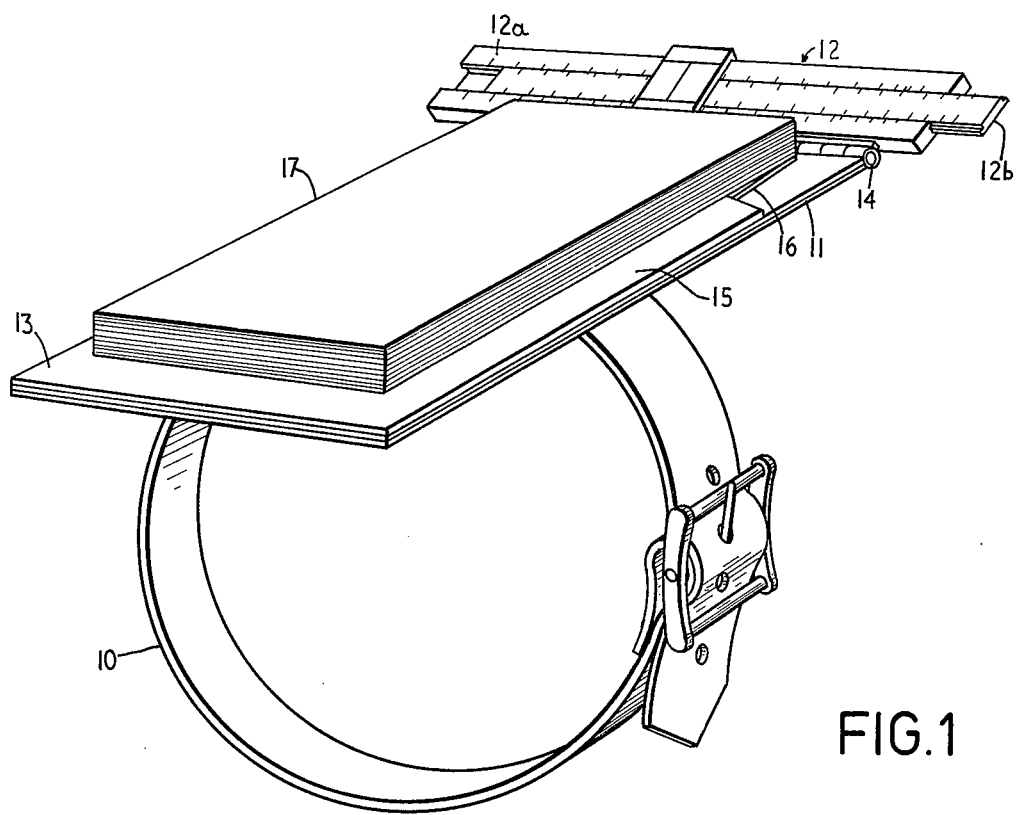
FIG. 1 is a perspective view of a kneepad according to the invention in the closed position.

The pilot's kneepad consists of a knee strap 10 adapted to be fastened around a pilot's leg and secured by a buckle or any other convenient means. To the band 10 is affixed a first plate 11 which in use is supported on and overlies the upper surface of a seated pilot's thigh. Along the forward edge of the plate 11 and preferably formed integrally therewith is a slide rule 12 consisting of a body 12a and a slide 12b which is adapted for making calculations necessary for navigational purposes.

Overlying the plate 11 is a second plate 13 hingedly attached by the hinge 14 to the plate 11. On the upper surface of the plate 13 is a pocket 15 into which the rear card 16 of a jotting pad 17 of conventional construction is inserted.

The device is preferably made by moulding from plastic material to provide a light but robust construction.

The lower surface of the plate 13 and the upper surface of the plate 11 are used as carriers of information for use in navigational calculations. Such information is readily accessible to the pilot who has only to pivot the upper plate 13 and with it the jotting pad 17 about the hinge 14 to the position shown in FIG. 2 in which the information contained on the two plates is displayed to him.

In the embodiment of the invention illustrated in the sketches the upper surface of plate 11 is used to display atmospheric data and the lower surface of the upper plate 13 to display a number of conversion strips by means of which the pilot may make direct conversions between a variety of different units for example degrees farenheit and degrees celsius. It should be emphasised however that any desired information may be displayed on the surfaces the important factor being its ready accessibility to the pilot.

The embodiment of the invention described above is given by way of example only as constituting a preferred form of the invention as defined broadly above.

We claim:

1. A pilot's kneepad comprising, first plate means carrying permanent indicia on an upper surface thereof for use in navigational calculations, means connected with said first plate means for attachment of the kneepad to the upper surface of a seated pilot's thigh to lie flat thereon, a second plate means overlying said first plate means, said second plate means being hingedly connected to said first plate means along one edge thereof for movement of said second plate between a closed position in which said upper surface of said first plate means and a lower surface of said second plate means are in face-to-face relation and an open position, means carried on an upper surface of said second plate means for attachment of a writing pad thereto, and permanent indicia carried on the lower surface of said second plate means for use in navigational calculations whereby said permanent indicia on said upper surface of said first plate means and on said lower surface of said second plate means are readily available for view and use by the pilot when said second plate means is in the open position, and whereby a writing pad attached to said upper surface of said second plate means is in position for use by the pilot when said second plate means is in the closed position.

2. A pilot's kneepad as claimed in claim 1 wherein there is formed integrally with said first plate means and extending along one edge thereof a slide rule body having a slide therein.

3. A pilot's kneepad as claimed in claim 2 wherein said slide rule body extends along a forward edge of said first plate means.

4. A pilot's kneepad as claimed in claim 1 wherein said means for attachment of said writing pad to the upper surface of said second plate means comprises a pocket on said upper surface of said second plate means for receiving therein a part of said writing pad.

* * * * *